United States Patent [19]

Powell

[11] 4,144,584

[45] Mar. 13, 1979

[54] REMOTE CARD OPERATED TERMINAL EXTENSOR CIRCUITRY

[75] Inventor: Kenneth E. Powell, San Jose, Calif.

[73] Assignee: International Business Machines Corporation, Armonk, N.Y.

[21] Appl. No.: 863,831

[22] Filed: Dec. 23, 1977

[51] Int. Cl.² ............................................. G06F 3/08
[52] U.S. Cl. .................................................. 364/900
[58] Field of Search ... 364/200 MS File, 900 MS File; 340/149 A; 235/379, 380

[56] References Cited

U.S. PATENT DOCUMENTS

| | | | |
|---|---|---|---|
| 3,303,472 | 2/1967 | Chalker, Jr. et al. | 364/900 |
| 3,314,051 | 4/1967 | Willcox et al. | 340/152 R |
| 3,898,373 | 8/1975 | Walsh | 364/200 |
| 4,025,760 | 5/1977 | Trenkamp | 340/149 A |
| 4,025,905 | 5/1977 | Gorgens | 364/900 |

Primary Examiner—Harvey E. Springborn
Attorney, Agent, or Firm—George E. Roush

[57] ABSTRACT

This all electronic extensor circuitry enables any one of a multiple of remote card operated terminals to be individually switched onto an electronic data transmission line formerly accommodating only one such remote terminal. The circuitry is arranged to lock out all but the active terminal for the normal time taken to interchange control signals and to enter data. Circuitry is also included for converting very short incoming control pulse signals to very long control pulses for actuating devices and/or circuitry controlled by the terminal. The terminals are identified by tone signals transmitted over an additional wire line pair. For line lengths greater than 2 kilometers, voice grade telephone lines are preferred, and simplified modems for this purpose are disclosed.

18 Claims, 7 Drawing Figures

REMOTE CARD OPERATED TERMINAL EXTENSOR CIRCUITRY

The invention relates to remote card operated terminal systems, and it particularly pertains to extensor circuitry for such systems.

At the present time there are a large number of central data processing stations in use having a number of remote terminals which are switched into and out of active participation in the system by the use of a manually presented and operated card. Examples of such systems are found in point-of-sale transaction authorizing and recording systems and like data and/or personnel access systems. The cards used are embossed, punched or have magnetic record stripes with data pertinent to the transaction. Entry of a card in a card sensing terminal effects in a predetermined automatic program the identification and/or authorization of entry, the recording of the transaction as necessary, and the carrying out of the various other steps as may be desired in the process.

While systems having relatively large numbers of data input terminals capable of handling large numbers of data input terminals rendering the systems capable of handling large numbers of transactions in relatively short periods of time are available, there is a need for extensors to the equipment for enabling still larger numbers of terminals to be connected to the central data processing stations whereby many more remote locations can be connected into a system.

In general extensors, particularly multiplexing apparatus, for communicating equipment are old, however, there are none, the applicant is aware for the purpose of the apparatus according to the invention as disclosed hereinafter.

That prior art which is pertinent to the development of the invention is to be found in the following U.S. Patents:

| | | | |
|---|---|---|---|
| 2,022,991 | 12/1935 | Walter | 177/314 |
| 2,728,074 | 12/1955 | Cesareo | 340/346 |
| 3,117,303 | 1/1964 | Byrne | 340/147 |
| 3,160,793 | 12/1964 | Colburn et al. | 317/137 |
| 3,314,051 | 4/1967 | Willcox et al | 340/152R |
| 3,428,750 | 2/1969 | Hoffman | 179/5 |
| 3,691,527 | 9/1972 | Yamamoto | 340/149A |
| 3,820,071 | 6/1974 | Angus | 340/149A |
| 3,903,499 | 9/1975 | Oliver | 340/19 |
| 3,914,743 | 10/1975 | Fitch et al | 340/147R |
| 3,937,889 | 2/1976 | Bell et al | 179/2DP |

The patents to Walter, to Cesareo, to Byrne, to Colburn, and to Hoffman are directed to relay circuitry to relatively basic alarm and like communication terminal systems. Interlocking and sequential reporting sub-systems are included. These state-of-the-art arrangements illustrate the desire for but not the advanced systems according to the invention.

The patent to Wilcox and Smith is directed to a selective calling system having a number of remote stations to which a "busy tone" signal is transmitted to all but the active station. The arrangement suggests interlocking, but there is no teaching of any interlocking function originating at the remote terminal.

The patents to Yamamoto and to Angus are directed to credit card validating circuit arrangements in remote station communications systems. The Yamamoto apparatus, in particular, incorporates means for assigning a priority of operation based on the order of insertion of the cards into the respective stations, however, the latter arrangement relies on communications to a central station for establising the priority whereby the teaching is not of value for extensor circuitry like that of the invention.

The remaining patents to Oliver to Fitch et al and to Bell et al are directed to subcircuit arrangements of interest in extensor circuitry according to the invention but which are different in both theory of operation and structure. The interlocking feature of the invention is not found or suggested in any of these references.

The objects indirectly referred to hereinbefore and those that will appear as the specification progresses obtain in electronic extensor circuitry having provisions for sensing an active terminal, and completing the electronic transmission line connections therefor and, at least for a limited time, locking out all other terminals connected through the circuit to the control processing station or other utilization apparatus. Preferably the extensor circuitry is biased to maintain a predetermined terminal on line at all times in the absence of activity on the part of any other terminal; this facilitates inspection, trouble shooting and the like.

Sensing is preferably accomplished with optocoupler components which are quite sensitive but also provide excellent isolation when idle for which reason they are sometimes referred to as opto-isolator components. The optocoupler component is connected for triggerng a relatively medium period monostable flip-flop circuit for completing an electronic connection through an AND gating circuit to the transmission line. The multiple of flip-flop circuits are so interconnected that when one is activated, the others are cleared for the duration of the desired time period.

A similar optocoupler component and relatively short period monostable flip-flop circuit sense and relay digital output pulses from the central processing station. The relatively short pulse is lengthened to a relatively long pulse by means of a relatively long period monostable flip-flop circuit. One such flip-flop and the necessary gating circuit is provided for each terminal; the medium period flip-flop circuits are connected through the gating circuits for arming the medium period flip-flop circuits for triggering by the short period flip-flop circuit. In this manner electromechanical devices at the terminal can be controlled for a period of seconds.

The terminals are identified, if desired, by a tone generator at the extensor for transmitting tone signals over another transmission line to tone detecting and converting circuitry at the central processing station. The tone generator is connected to the medium period flip-flop circuits for triggering on the rise of signal from the active terminal.

For long distances, voice grade telephone and like service transmission lines are used with simplified modem circuits according to the invention.

In order that the advantages of the invention fully obtain, preferred embodiments are described hereinafter, by way of example only, with reference to the accompanying drawing, forming a part of the specification and in which.

Figure 3A:
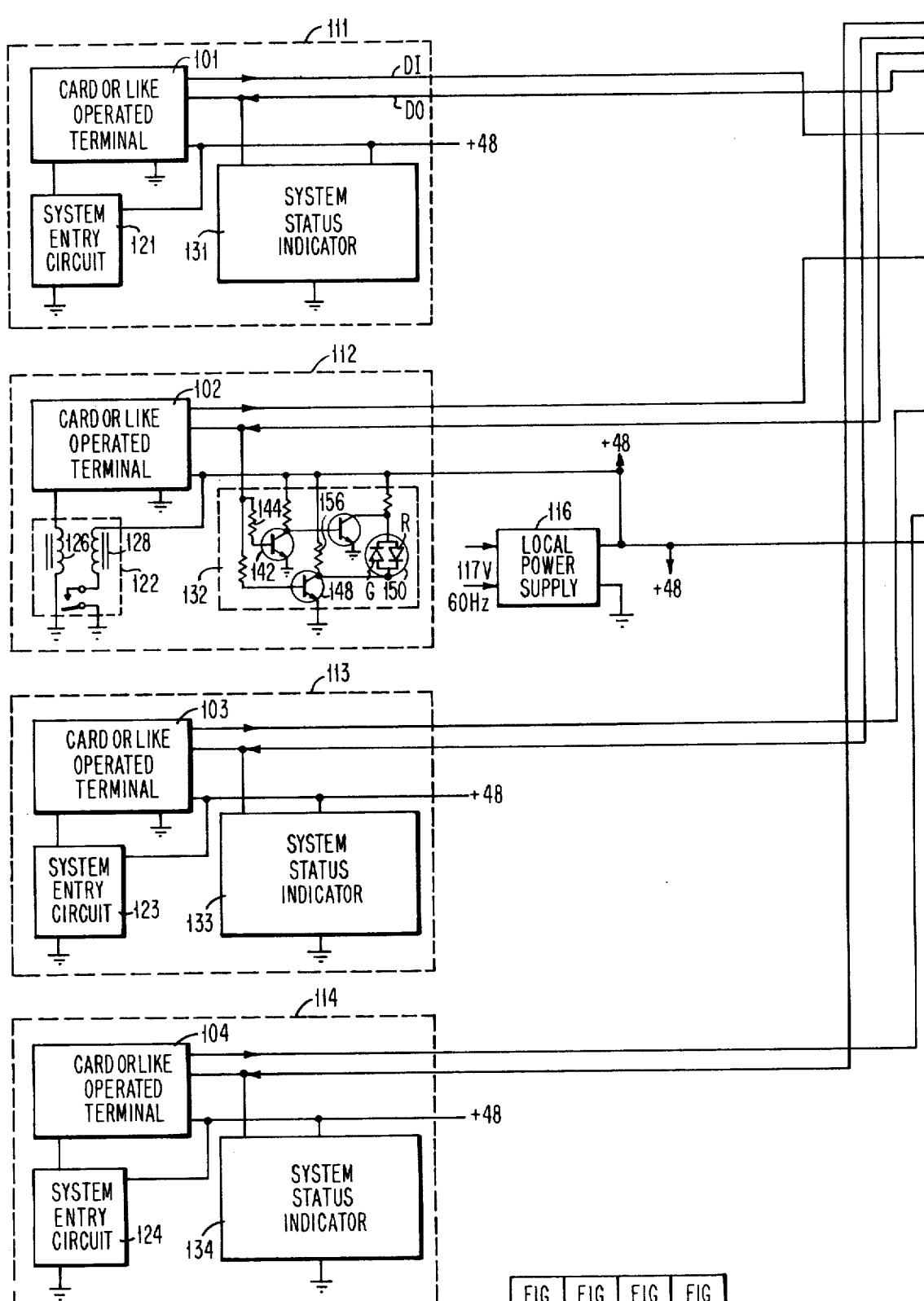
Figure 3B:
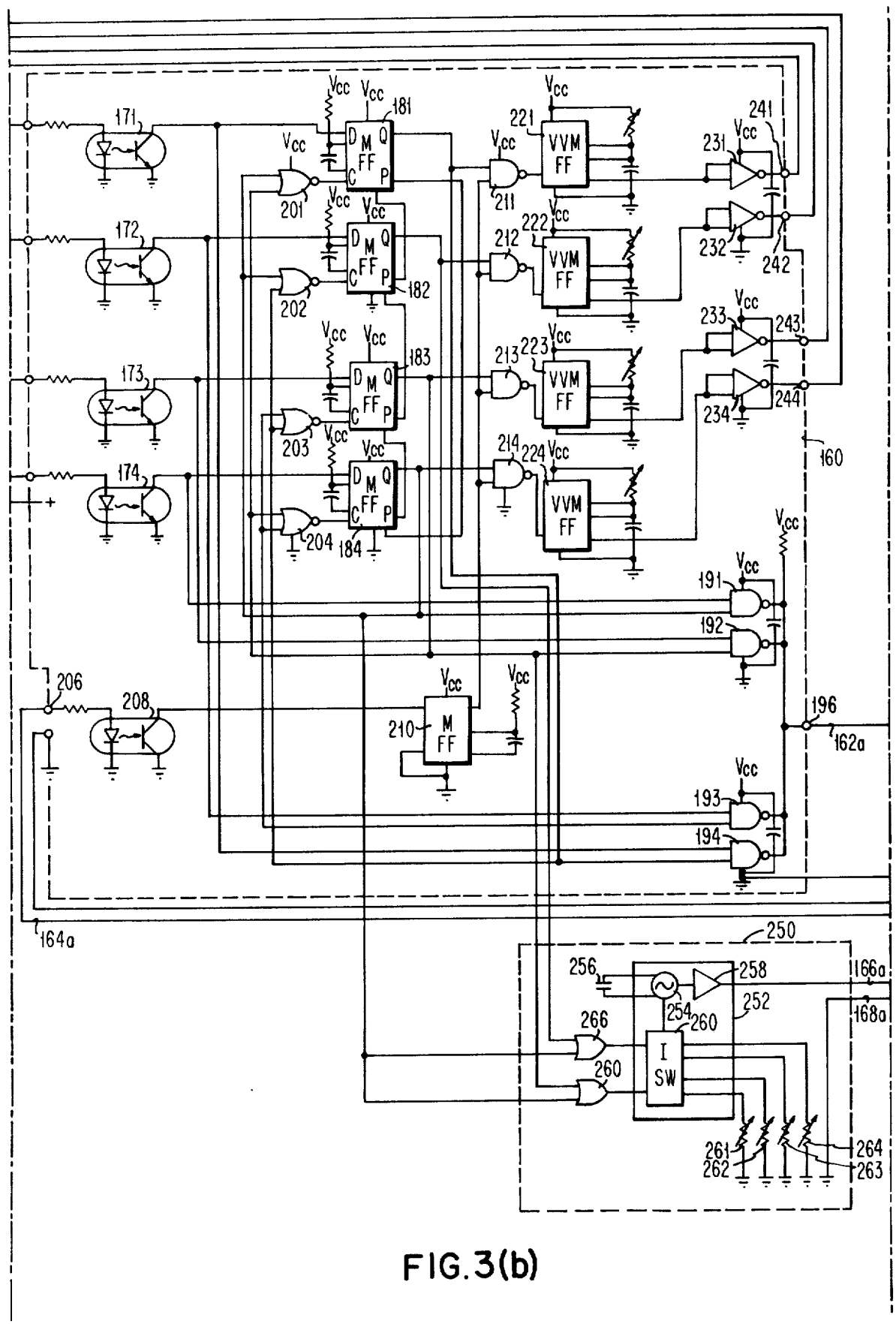
Figure 3C:
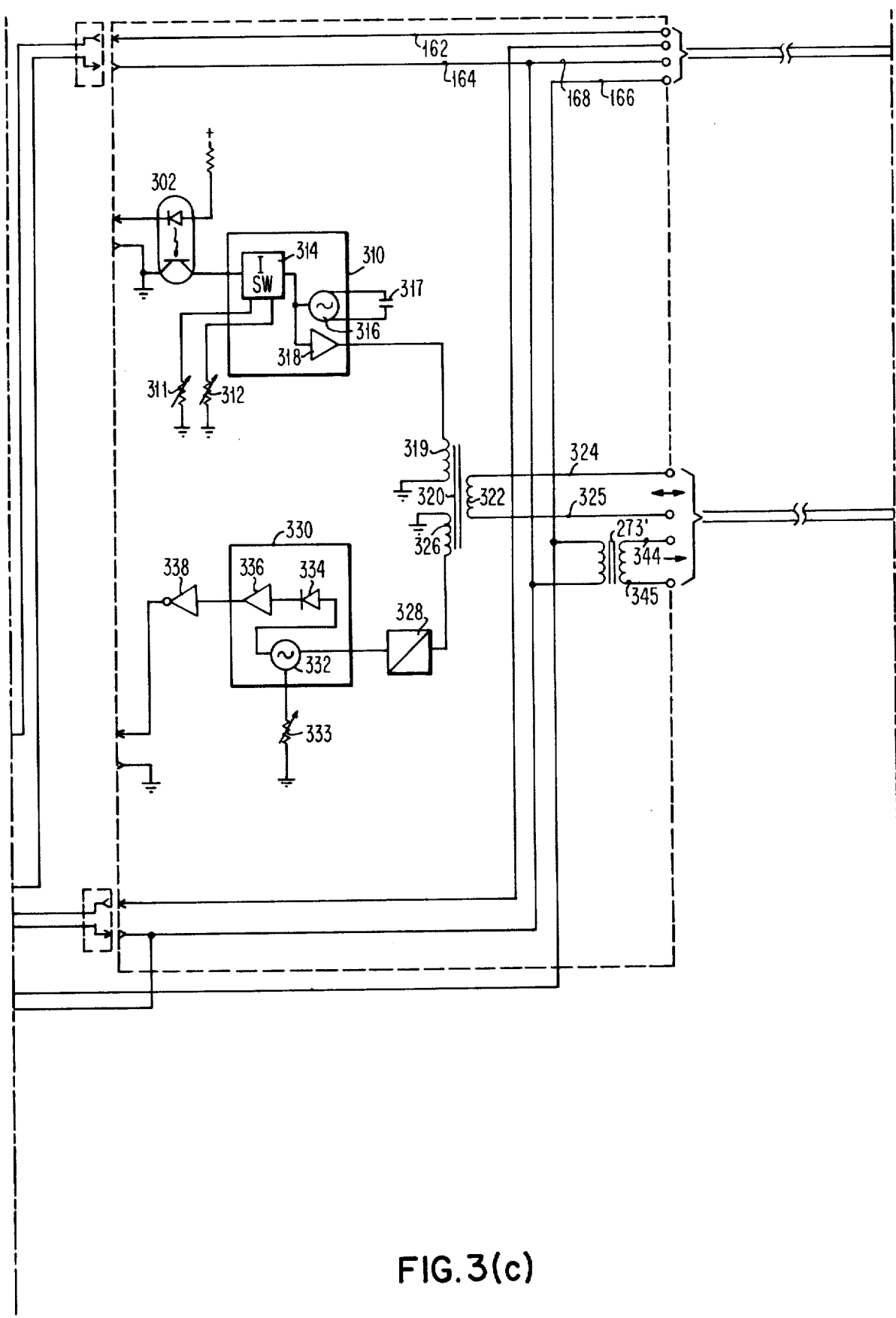
Figure 3D:
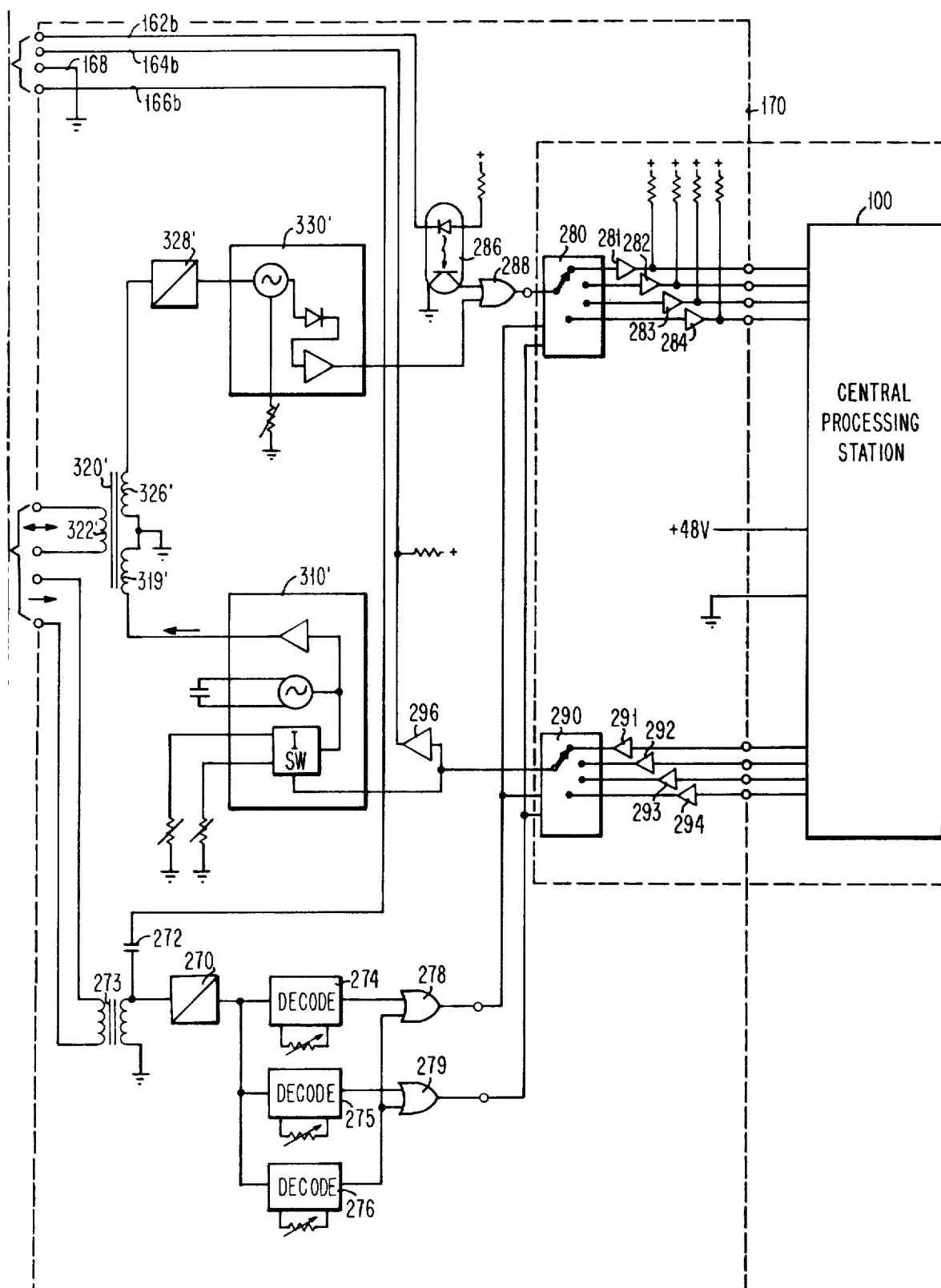
Figure 4:
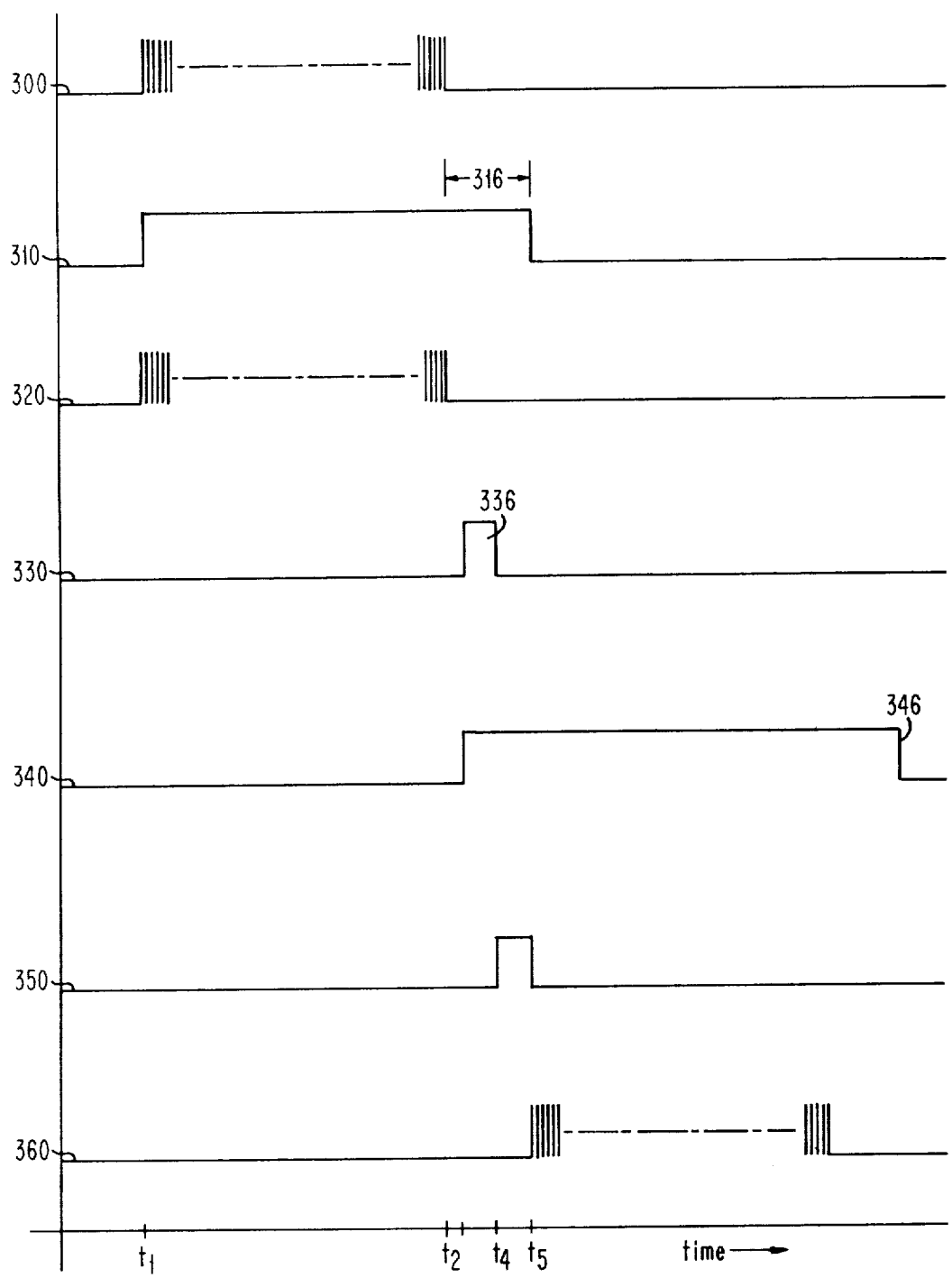

FIG. 3 — sections (a), (b), (c) and (d) being taken together —is a logical diagram of a typical data gathering system employing an extensor system according to the invention; and FIG. 4 is a graphical representation of waveforms obtained in operation of the circuitry depicted in FIG. 3.

Data processing apparatus of the type for which the extensors according to the invention are intended are normally equipped with a digital data input terminal and a digital data output terminal which communicate internally in various conventional modes of operation. This operation will not be described in detail at this point, but the pertinent details will be furnished hereinafter as the description progresses. In addition to the two digital data terminals, two direct potential supply terminals are conventional, whereby four-wire cable is used for connecting terminal sets to the processor. It is a feature of the systems according to the invention that two voice-grade telephone pairs (of wires) are more than adequate for this purpose.

Figure 1:
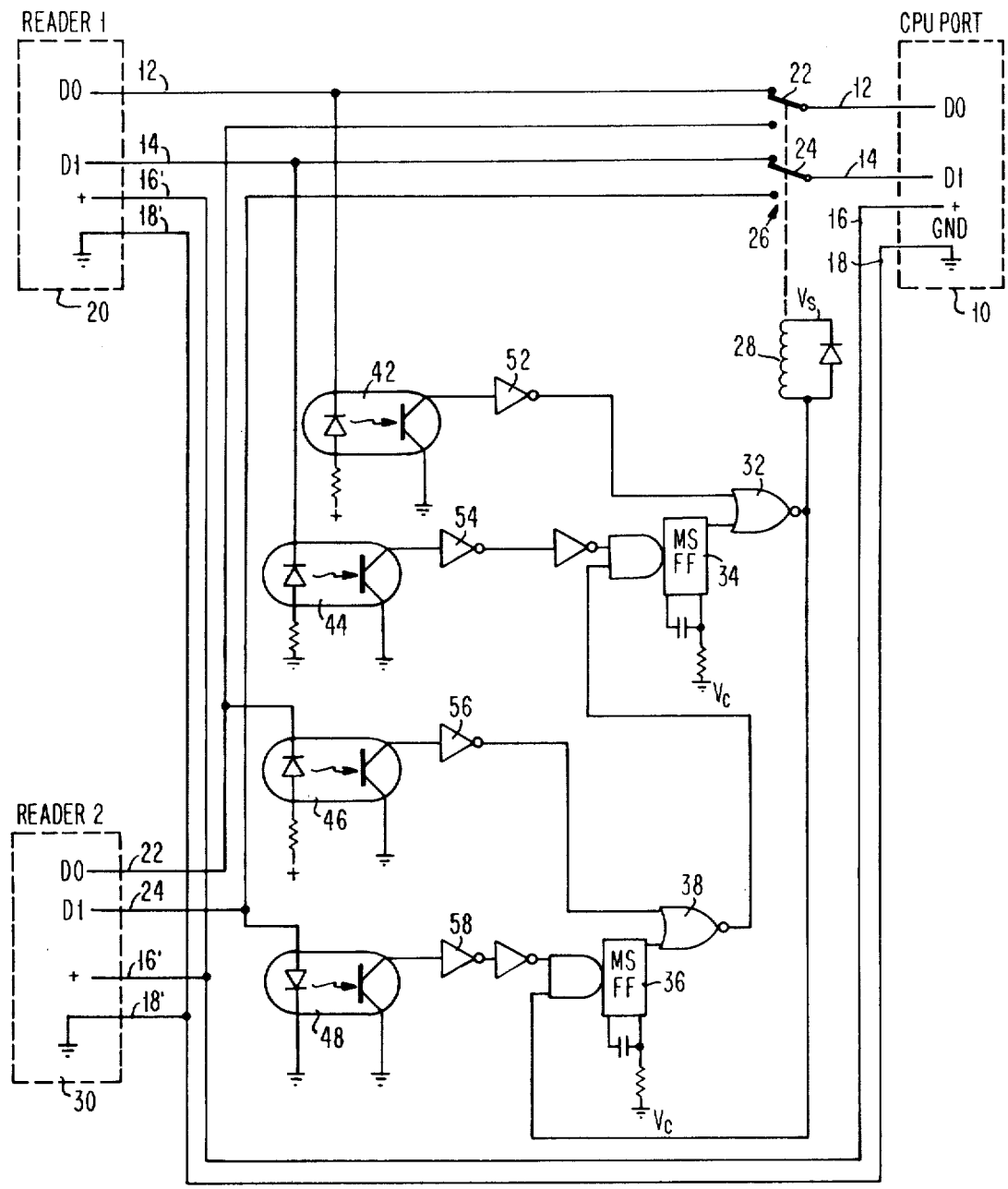
FIG. 1 is a logical diagram of a voice and exemplary extensor system according to the invention.

Referring now to the drawing FIG. 1 shows exemplary circuitry for switching an additional remote terminal into a central processor port without interaction between terminals and without changing the processor or requiring initiating action therefrom.

A data processor (not shown) has one or more ports 10. Each port has an output line 12, an input line 14, a direct potential line 16 and a ground line 18 serving as a return path for each of the other lines. A terminal 20 is normally connected to the other ends of the lines for predetermined signaling from one to the other. Four conductor telephone type cables are usually used. Only two lines are shown completely for clarity; the return line 18 is evidenced by the ground symbol and the direct potential line by the + symbol. A prearranged sequence of events at the terminal 20 causes signals to be sent by way of the signaling lines 12 and 14 to the processor 10 and interaction between the two units is the usual case.

Frequently, the processing unit 10 does not have a sufficient number of ports for serving a larger number of terminals. This circuit will permit additional terminals to be added where the combined traffic will permit.

The signaling lines 12 and 14 are now connected to arms 22, 24 of a double-pole, double-throw relay contact stack 26 located conveniently near the terminal 20 and the corresponding signaling lines 12' and 14' are connected to the near contracts as shown opposite to the convention when the solenoid 2 of the relay is energized. The corresponding lines 22' and 24' of an additional terminal 30 are connected to the off (back) contacts as shown. The remainder of the lines are simply connected in parallel. The principal terminal 20 is now coupled to the processor port 10 and the expander circuitry to be described is arranged so that no action at the terminal 20 can be interrupted by similar action at the added terminal 30.

The solenoid 28 is energized by bringing the lower end to ground through the action of a NOR gating circuit 32. Two monostable D-C flip-flop circuits 34, 36 insure that the first activated terminal is given timwe to complete the action before the other terminal can be activated. Cross coupling of the flip-flop circuits 34 and 36 through the relay NOR gating circuit 32 and another NOR gating circuit 38 insure that only one terminal is connected to the CPU at any one time.

Optocoupler components 42, 44, 46 and 48 sense activity of the DO lines 12' and 22' and the DI lines 14' and 24'. Corresponding inverting level triggering amplifiers 52, 54, 56 and 58 translate the sensed levels to the NOR gating circuits 34, 36. For clarity in this specific hook-up, the latter as shown with external logic circuitry corresponding to internal connections.

As illustrated, typical operation may begin with the activation of the terminal 20. The DI line 14' is brought to the ground and the flip-flop circuit 34 is activated provided that the other flip-flop circuit 36 is not active. The driver NOR gating circuit 32 is then active in energing the relay 28-26 for making the connections as shown (opposite to the coinvention for relay contact symbols). The DO line 14' goes down later than the DI line 12', if the data message on the DO line has been recognized as valid, but before the flip-flop circuit 34 times out, delegating computer control to complete the action, the activation of the terminal 30 results in similar functioning except that the relay is not energized since it resets on the normally-closed off contacts of the contact stack 26.

Figure 2:
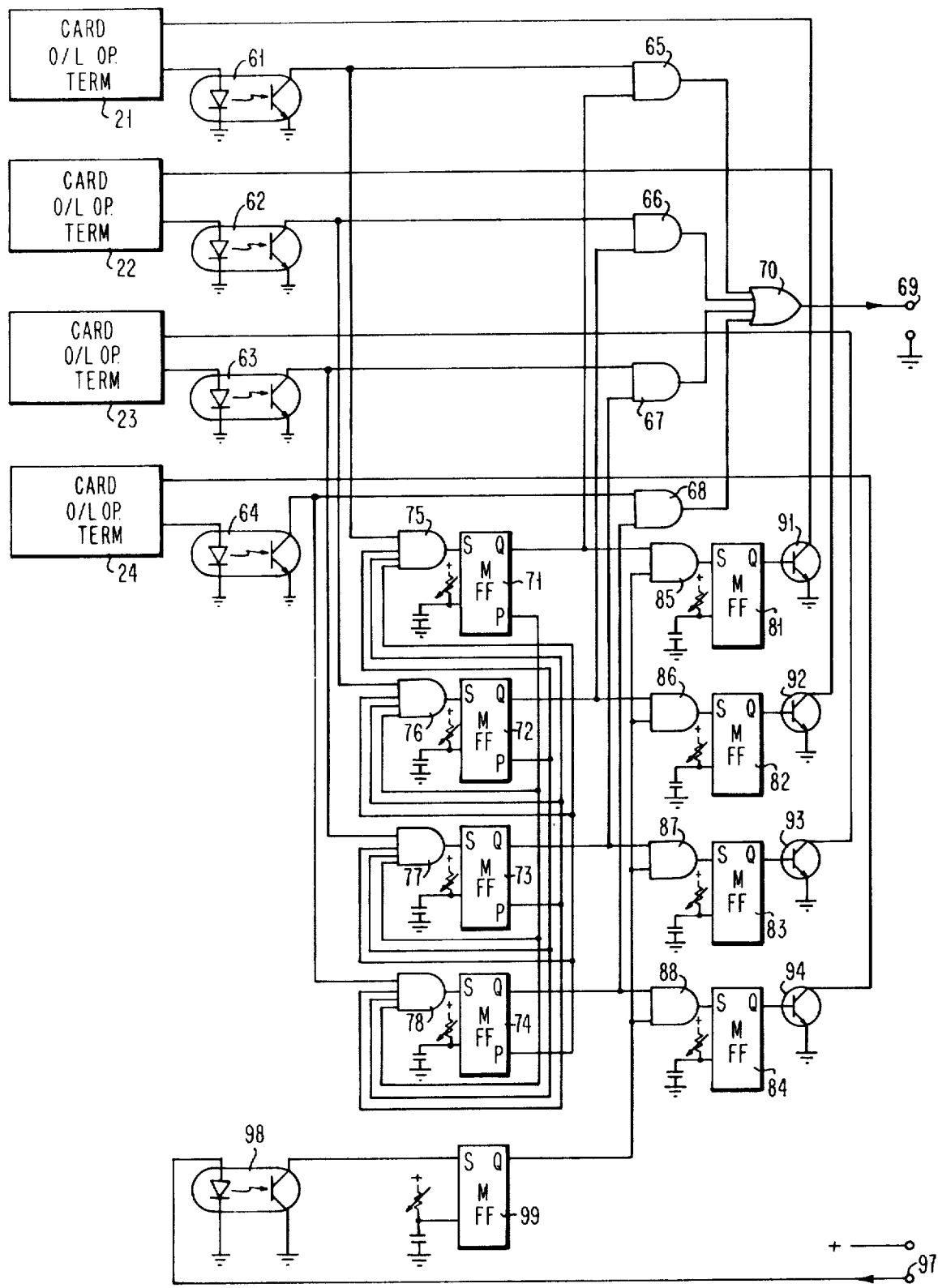
FIG. 2 is a logical diagram of basic all solid-state electronic extensor circuitry according to the invention.

FIG. 2 is a logical diagram of basic extensor circuitry comprising only solid-state electronic circuit components and arranged for coupling four or more remote terminals to a single-terminal transmission line. Four card or like operated terminals 21–24 are shown in this extensor circuitry for connecting any one of them at any one time over a single set of conductors normally accommodating only the terminal 21. The terminals 21–24 are normally isolated by optocoupler components 61–64 respectively. The output circuits of the latter are individually connected to one lead of each of four AND gating circuits 65–68, the output leads of which are connected directly to an OR gating circuit 70. The output lead of this OR gating circuit 70 is connected to output terminal 69 which eventually leads to the Digital Input (DI) terminals of a data processing station (not shown). The AND gating circuits are actuated for 75 milliseconds by connections to the erect (Q) output terminals of monostable flip-flop circuits 71–74. The latter flip-flop circuits and associated AND gating circuits 75–78 are connected in interlocking fashion whereby only one of the flip-flop circuits 71–74 is active at any one time. The output circuits of the optocoupler components 61–64 are individually connected to AND gating circuits 75–78 respectively. Each of these AND gating circuits has three other input leads connected to the inverted P(=Q̄) output terminals of the flip-flop circuits other than the one to which the output lead of the AND gating circuit is connected. In this manner an optocoupler circuit, 62 for example, will activate AND gating circuit 76 and the associated flip-flop circuit 72 only if flip-flop circuit 71 73 and 74 are in the stable state thereby arming the AND gating circuit 76.

The Q output terminals of the flip-flop circuits 71–74 are individually applied to input leads of four AND gating circuits 85–88 each having an individual monostable flip-flop circuit 81–84 connected thereto. The latter flip-flop circuits are of the voltage variable type and remain in the unstable state from one to 15 seconds for most applications. The Q output terminals of the flip-flop circuits 81–84 are connected to the respective card or like operated terminals 21–24 by current sourcing circuitry shown here simply as transistors 91–94 respectively. The Digital Output (DO) signal from the central processing station is applied to an input terminal 97 for application to another optocoupler component 98. The output circuit of the latter optocoupler component is connected to the set terminal of a 2 milisecond monostable flip-flop circuit 99. The output pulse from the flip-flop circuit 99 is applied in common to each of the AND gating circuits 85-88 for triggering the associated flip-flop circuit of the multiple of each circuits 81-84. The latter flip-flop circuits are also of the voltage variable types. As shown these circuits are in the unstable state for 1-15 seconds depending on the application. Thus the input pulse at terminal 97 need only be long enough to trigger the flip-flop circuit 99 for arming the AND gating circuits 85-88 and actuating the associated one of the flip-flop circuits 81-84 for a relatively much longer time for insuring proper operation of the card or like operated terminals 21-24. More sophisticated semiconductor circuitry as is commercially available enables this basic circuit to be constructed more economically as will be seen in the following description.

Referring to FIG. 3 as a whole, there is shown a central processing station 100 in such detail only for illustrating the need for and use of extensor circuitry according to the invention. The station has adequate power supply for providing (48 volts) direct potential with respect to a point of fixed referenced potential shown in the drawing as ground, which potential may be applied to remote data terminals 101-104 for energizing them or a local power supply may be used, as desired. The remote data terminals are usually designed for use with a particular central processing station in accordance with conventional design practice. Only the design details necessary for an understanding of the invention will be treated here. As shown the central processing station 100 has a number of data input/output ports, of which only four are illustrated. Each port comprises at least a Digital Input (DI) line and a Digital Output (DO) line. Thus for short distances two-pair wire lines are connected from the central processing station 100 to each remote data terminal 101 and the like for interchanging digital DI/DO signals and for supplying direct energizing potential to the terminal. Alternately a local power supply 116 as shown in FIG. 3(a) is used at the terminal location. The art of regulating circuit components has advanced to the level whereat the output voltage of the local power supply is readily maintained within the output voltage at the central processing station within the desired tolerance. Local logic level voltages can therefore be provided which match those of the central processing station sufficiently close as to avoid any malfunctioning. Card and like operated remote data terminals 101-104 compatible with the associated central processing station are usable "as is" with the extensor circuitry according to the invention, however, system entry circuits 121-124 are shown associated with the respective card operated terminal 101-104 as external circuitry, though obviously, they may be and usually are internal. As shown, the system entry circuit 122 comprises a relay 126 having a simple armature and contact stack for activating an entry device shown here, for example, as a simple solenoid 128.

Although not absolutely necessary, systems status indicators 131-134 are preferably provided to give the card terminal operator an indication of the status of the system at any time. The circuitry of the system status indicator 132 is shown schematically. Logic levels in the system are +48 for "inactive" and 0 volts, or ground potential, for "valid". Under static conditions the DO line (system response) is "inactive" or +48 volts. This positive voltage forward biases a transistor 142 by way of a resistor 144, the value of which limits the base current to a safe level (approximately 500 microamperes). In order not to load the DO line and generate an artificial response, the conduction of transistor 142 is arranged to cut off a transistor 146. Another transistor 148 will be conducting since its base is in parallel with the base of the transistor 142. With the transistor 146 cut off and the transistor 148 conducting, current will flow through a diode R (Red Cathode) of a dual light-emitting diode (LED) 150 and will be limited by the value of a resistor 154. Under these conditions the indicator will glow red, indicating that the system status is "normal". When a card is inserted into the remote data terminal 102 and is validated by the operation in the central processing station 100, the response will be indicated by a level of zero volts, or ground potential, on the DO line (valid). This will reverse bias the transistors 142 and 148. The transistor 146 will be forward biased by way of a resistor 156. With the transistor 146 conducting and the transistor 148 cut off, the other, green cathode diode of the LED 150 will be forward biased. Current will be limited by the resistor 156. Under these conditions the indicator will glow green, indicating a valid query and associated response. Failure in the system will cause the +48 fault line to drop and both diodes R & G of the indicator to be extinguished, signaling the operator to make another arrangement.

The remote data terminal 111-114 are connected one at a time only through an expander unit 160 over a wire line comprising four conductors 162-168 to a line reception unit 170 connected to the central processing station 100. Referring particularly to FIG. 3(b) the expander unit 160 comprises one optocoupler unit 171-174 for each terminal to be connected. The output of each optocoupler is connected individually to a data input or set terminal of a flip-flop circuit 181-184 and one input lead of a NAND gating circuit 191-194, another input lead of which is coupled to the erect (Q) output terminal of the flip-flop circuits 181-184. The output leads of the NAND gating circuits 191-194 are connected in common to an output terminal 196 to which a conductor 162a is connected for applying the output to the conductor 162 as will be later described in more detail. The flip-flop circuits 181-184 preferably are of a type similar to the commercially available Texas Instruments dual retriggerable monostable multivibrator 74123 wherein the C terminal is connected to the D signal through an internal inverter circuit. Four NOR gating circuits 201-204 have the output leads thereof individually coupled to the inverted input or reset terminals of the flip-flop circuits 181-184 respectively. The inverted output P(=$\overline{Q}$) terminals of the flip-flop circuits 181-184 are connected in "ring fashion" as shown to other clear terminals of the flip-flop circuits 184, 183, 182 and 181 whereby only one of the four flip-flop circuits is active at any one time. The Q output terminals of the flip-flop circuits 181-184 are interconnected with the input leads of the NOR gating circuits 201-204 for holding the respective flip-flop circuits 181-184 off until an optocoupler component is activated.

A conductor 164a leads from the wire line conductor 164 to input terminals 206 and another optocoupler unit 208. The latter is connected to triggering terminal of another monostable flip-flop circuit 210 at the output terminal of which a pulse indicative of digital output from the central processing station 100 is presented for actuating one of a multiple of NAND gating circuits 211-214. The active NAND gating circuit is that corresponding to the monostable flip-flop circuit 181-184 which is active in response to triggering from its associated optocoupler unit 171-174. Thus a recognition signal from the central processing station 100 is delivered at the output lead of the actuated one of the NAND gating circuits 211-214. The latter AND gating circuits are individually connected to associated variable voltage monostable flip-flop circuits 221-224. These variable voltage monostable flip-flops are used to provide a much longer pulse to driving circuits 231-234 for delivery at output terminals 241-244 which are connected to the card or like operated remote data terminals 101-104. Thus there is shown an expander unit 160 which individually couples one only of a multiple of remote terminals 101-104 to a central processing station 100 without inter reaction any way between the remote terminals.

While it is not necessary in many cases to identify which one of the remote terminals 101-104 is actually connected to the central processing station 100, it is contemplated according to the invention that such identification be provided if desired and an identification unit 250 is provided therefor.

The heart of the identification unit 250 is a commercially available integrated circuit 252, frequently used as a frequency shift keying control. It comprises a voltage controlled oscillator 254, the range of which is selectable by an external capacitor 256. Amplifier circuitry 258 serves to raise the output level and isolate the oscillator 254 from the external circuits. The voltage controlled oscillator is arranged to provide multiple of tones in response to a binary current switch 260 arranged for connecting one of the number of adjustable tone determining resistors 261-264 into the oscillator voltage controlling circuitry. Two OR gating circuits 266 and 268 have the output leads thereof connected to the input leads of the current switch 260. The input leads of the OR gating circuits 266 and 268 are connected to erect output terminals of the flip-flop circuits 181-184 in binary coded decimal coding circuitry form. As shown in this arrangement, one tone, F1 corresponding to the card operated terminal 101 normally is left on to eliminate an echo effect. The circuitry is arranged to leave the central processing station 100 connected to the terminal 101 in the idling mode.

Referring to FIG. 3(b) the output of the identification unit 250 appears in the line reception unit 170 on conductor 168b where it is applied to a band pass filter 270. Preferably a capacitor 272 or a transformer such as an alternate input transformer 273 is interposed in the input since it is the alternating current component of the waveform that is of interest. Frequency decoders 274, 275 and 276 are tuned to frequencies F2, F3 and F4 respectively for developing switching potential which is applied thru OR gating circuits 278 and 279 in binary fashion to a one-line-to-four-line demultiplexer 280. As shown the connections are made to switch the demultiplexer 280 only if remote terminals 102, 103 and 104 are active because otherwise the data terminal 101 is always recognized in the circuit arrangement as shown. An additional decoder for frequency F1 is alternatively employed if no one of the remote terminals is normally connected. Amplifying circuits 281, 282, 283 and 284 are employed to raise the level at the multiplexer 280 to that convenient for the DI ports of the central processing station 100. The output of the expander unit 160 at the terminal 196 is brought in to the line reception unit 170 over a conductor 162b to an optocoupler component 286 and through an OR gating circuit 288 to the demultiplexer 280. Thus all of the data is transmitted over the one conductor to the demultiplexer 280 from which it is distributed to the central processing station 100 as desired. Another IC multiplexer 290 is switched by the binary output of the OR gating circuits 278 and 279 for connecting one of four amplifier circuits 291, 292, 293 and 294 to a single DO driver circuit 296. The output of the driver circuit is connected to conductor 164b for translating the digital output signal from the central processing station 100 to the input terminals 206 of the expander unit 160.

The extensor circuitry according to the invention is not limited to short wire lines. While it may seem obvious to substitute modem and telephone lines for the simple wire lines, it is an object of the invention to provide a simple and effective modem for extending the range of the system. Referring to FIG. 3(c) the conductor 162a from the expander unit 160 is applied to the input terminals of a modem 300 having an input optocoupler component 302. The output circuit of the optocoupler component 302 is applied to a frequency shift keying integrated circuit 310 which is substantially similar to the FSK unit 252. Resistors 311 and 312 are connected to a current switch 314 of the unit 310 for varying the voltage on a voltage control oscilator 316. A capacitor 317 is used to adjust the range of the oscillator. The output signal from the data terminals 101-104 as converted by the oscillator 316 is amplified in a amplifying circuit 318 and applied to a primary winding 319 of a hybrid transformer 320. This transformer is a conventional hybrid transformer as used with voice grade telephone circuits. A secondary winding 322 is connected to a twisted pair or similar transmission line having two conductors 324, 325. At the other end of this transmission line the conductors are connected to a hybrid winding 322' of a similar hybrid transformer. The DO data from the multiplexer 290 is applied to the input terminals of another FSK IC circuit 310' which is identical to the first one. The IC circuit 310' is connected to the primary winding 319' of the hybrid transformer 320' for sending the DO signal to the first hybrid transformer 320 where it is enduced in a secondary winding 326. The latter winding is connected to band pass filter 328 for applying the filtered signal to an FSK demodulator integrated circuit 330. The latter comprises a phase locked oscillator 332 which is trimmed by means of an adjustable resistor 333. The output of the phase locked oscillator 332 is applied to a detector circuit 334 and the rectified output is passed through an amplifier circuit 336 to a DO driver circuit 338 for application to the input terminals 206 of the encoder unit 160. Similarly a band pass filter 328' is connected to the secondary winding 326' of the hybrid transformer 325 in the line reception unit 170. The band pass filter 328' is coupled to a FSK demodulator integrated circuit 330' identical to the first one and the output DI signal is applied to the OR gating circuit 288 as shown. The output of the identification unit 250 is applied by conductor 166a to a transformer 273' having an output winding connected to a conductors 344 and 345 of a twisted pair of transmission line leading to the transformer 273 in the line reception unit 170 to complete the circuit.

Idealized waveforms obtained with the circuitry shown in FIG. 3 are graphically represented by the curves in FIG. 4 which should be useful in an understanding of the invention. A curve 300 represents the signal from one of the card operated terminals 101-104 on becoming active. This signal results in the corresponding one of the flip-flop circuits 181-184 being triggered for accepting the data as represented by a curve 310, with the time 306 from t. to t₅ being the time arranged for system response. The data to the system is represented by a curve 320. The system response time is represented by a following curve 330; note the narrow time pulse 336. This short time is made possible by generating the response, represented by a curve 340, locally at the terminal(s) 101–104 of the system rather than at the central processing station 100. The falling edge 346 represents the time that the system would be busy if it were not for locally generating the response wave. The following curve 350 represents the time that the system is released for accepting the next card entry and the final curve 360 represents the entry of a card from one of the other terminals on another card from the same terminal if that is the next one presented.

While the circuit arrangement has been shown with four data remote terminals, it has been described whereby those skilled in the art will readily adapt the teaching for accommodating more than four terminals and even many more than four terminals. Likewise the identification is expandible to many more than four tones by following the teaching setforth herein.

While the invention has been shown and described with reference to a preferred single specific embodiment thereof and alternate circuitry has been suggested, it should be clearly understood that those skilled in the art will make changes without departing spirit and scope of the invention as defined in the appended claims concluding the specification.

The invention claimed is:

1. Remote card-operated terminal extensor circuitry comprising
   a multiple of signal input terminals at each of which a card-operated terminal is to be attached,
   a signal output terminal at which a transmission line conductor normally connected to said card-operated terminal is to be attached,
   a common reference potential terminal at which like terminals of said card-operated terminals and another conductor of said transmission line are to be connected,
   a multiple of AND gating circuits having output leads connected in common to said signal output terminal, having input leads individually connected to said signal input terminals, and having arming input leads,
   a multiple of timing circuits having input terminals individually coupled to said signal input terminals for initiation upon signals appearing thereat and having output terminals to which said arming input leads of said AND gating circuits are individually connected.

2. Remote card-operated terminal extensor circuitry as defined in claim 1 and incorporating
   another input terminal at which a digital signal normally intended for a card-operated terminal is received,
   a multiple of output terminals at which individual connections to said card-operated terminals are to be made,
   another timing circuit having a trigger terminal connected to said other input terminal, and having an output terminal,
   another multiple of AND gating terminals having input leads connected in common to said output terminal of said other timing circuit, having another input leads connected individually to said multiple of timing circuits and having output leads individually coupled to said multiple of output terminals.

3. Remote card-operated terminal extensor circuitry as defined in claim 1 and wherein
   said timing circuits are monostable flip-flop circuits, and the input circuits of said flip-flop circuits are interconnected to the output terminals of said flip-flop circuits in permutations whereby in conjunction with said series circuit connections of said flip-flop circuits only one flip-flop circuit is activated at any given time,
   thereby to isolate all but one of said input terminals from said output terminal.

4. Remote card-operated terminal extensor circuitry as defined in claim 3 and incorporating
   an actuated terminal identification signal output terminal,
   identification signal generating circuitry having an output circuit connected to said identification signal terminal, having input terminals connected to said output terminals of said flip-flop circuits, and having selector circuitry for generating an identification signal of different tone corresponding to the signal input terminal activated at said given time.

5. Remote card-operated terminal extensor circuitry comprising
   a multiple of signal input terminals at each of which a card-operated terminal is to be attached,
   a signal output terminal at which a transmission line conductor normally connected to said card-operated terminal is to be attached,
   a common reference potential terminal at which like terminals of said card-operated terminals and another conductor of said transmission line are to be connected,
   a multiple of optocoupler components having the input circuits thereof connected individually between said input terminals and said common reference potential terminal and having output circuits,
   a multiple of retriggerable monostable data-set flip-flop circuits having set terminals individually connected to said output circuits of said octocoupler components, having reset terminals, complementary output terminals, and clear terminals with the clear terminals and inverted output terminals individually interconnected to form a series linking circuit,
   a multiple of NAND gating circuits having output leads connected in common to said signal output terminal, having input leads individually connected to said output circuits of said optocoupler components, and having arming input leads individually connected to the erect output terminals of said flip-flop circuits corresponding to said optocoupler components,
   a multiple of NOR gating circuits having output leads individually connected to said reset terminals of said flip-flop circuits and having two input leads each connected to said erect output terminals of said flip-flop circuits in permutations whereby in conjunction with said series circuit connections of said flip-flop circuits only one flip-flop circuit is activated at any given time,
   thereby to isolate all but one of said input terminals from said output terminal.

6. Remote card-operated terminal extensor circuitry as defined in claim 5 and incorporating another input terminal at which a digital signal normally intended for a card-operated terminal is received, a multiple of output terminals at which individual connections to said card-operated terminals are to be made, another optocoupler component having an input circuit connected between said other input terminal and said point of fixed reference potential and having an output circuit, another retriggerable monostable flip-flop circuit having a trigger terminal connected to said output circuit of said other optocoupler component, and having an output terminal, another multiple of AND gating terminals having input leads connected in common to said output terminal of said other flip-flop circuit, having another input lead connected individually to said multiple of flip-flop circuits and having output leads, another multiple of retriggerable flip-flop circuits having a trigger terminal individually connected to said output leads of said other multiple of AND gating circuits, and having output terminals individually coupled to said multiple of output terminals.

7. Remote card-operated terminal extensor circuitry as defined in claim 6 and incorporating a multiple of driving circuits individually interposed between said output terminals of said other multiple of flip-flop circuits and said multiple of output terminals, 8. Remote card-operated terminal extensor circuitry as defined in claim 6 and wherein said multiple of driving circuits are inverting circuits.

9. Remote card-operated terminal extensor circuitry as defined in claim 6 and incorporating system status indicating circuitry adapted for location at a card-operated terminal having an input circuit connected between the corresponding one of said multiple of output terminals and said point of reference potential and having a dual optical dislay indicating component in the output circuits thereof.

10. Remote card-operated terminal extensor circuitry for accommodating a multiple of such terminals on a transmission line from a central processing station normally accommodating but one such terminal, comprising a transmission line having a multiple of conductors connected at one end to said central processing station, said central processing station having at least one digital data input and associated output port leading to component circuitry for processing digital data received at said input port and delivering corresponding data at said output port for transmission to a remote card operated terminal, said card-operated terminal having a port corresponding to said input and output port of said central processing station and internal circuitry for generating an electric digital signal responsive to said card for transmission over said transmission line to said central station and for responding to said corresponding data received from said central station, extensor circuitry connected to said transmission line at the other end thereof and connected to a multiple of said code responsive card-operated terminals, said extensor circuitry comprising a common reference potential terminal at which like terminals of said card-operated terminals and another conductor of said transmission line are to be connected, a multiple of optocoupler components having the input circuits thereof connected individually between said output terminals of said card-operated terminals and said common reference potential terminal and having output circuits, a multiple of retriggerable monostable data-set flip-flop circuits having set terminals individually connected to said output circuits of said optocoupler components, having reset terminals, complementary output terminals, and clear terminals with the clear terminals and inverted output terminals individually interconnected to form a series linking circuit, a multiple of NAND gating circuits having output leads connected in common to said transmission line, having input leads individually connected to said output circuits of said optocoupler components, and having arming input leads individually connected to the erect output terminals of said flip-flop circuits corresponding to said optocoupler components, a multiple of NOR gating circuits having output leads individually connected to said reset terminals of said flip-flop circuits and having two input leads each connected to said erect output terminals of said flip-flop circuits in permutations whereby in conjunction with said series circuit connections of said flip-flop circuits only one flip-flop circuit is activated at any given time, thereby to isolate all but one of said card-operated terminals from said central processing station at any one time.

11. Remote card-operated terminal extensor circuitry as defined in claim 10 and incorporating an actuated terminal identification signal output terminal, an identification signal generating circuit having an output circuit connected to said identification signal terminal, having binary logical signal input terminals connected to said erect output terminals of said flip-flop circuits, and having selector circuitry for generating an identification signal different tone corresponding to the signal input terminal activated at said given time.

12. Remote card-operated terminal extensor circuitry as defined in claim 10 and incorporating a multiple of output terminals at which individual connections to said card-operated terminals are to be made, another optocoupler component having an input circuit connected between another conductor of said transmission line and said point of fixed reference potential and having an output circuit, another retriggerable monostable flip-flop circuit having a trigger terminal connected to said output circuit of said other optocoupler component, and having an output terminal, another multiple of AND gating terminals having input leads connected in common to said output terminal of said other flip-flop circuit, having another input lead connected individually to said output terminals of said multiple of flip-flop circuits and having output leads, another multiple of retriggerable flip-flop circuits having a trigger terminal individually connected to said output leads of said other multiple of AND gating circuits, and having output terminals individually coupled to said multiple of output terminals.

13. Remote card-operated terminal extensor circuitry as defined in claim 12 and incorporating a multiple of driving circuits individually interposed between said output terminals of said other multiple of flip-flop circuits and said multiple of output terminals, 14. Remote card-operated terminal extensor circuitry as defined in claim 13 and wherein said multiple of driving circuits are inverting circuits.

15. Remote card-operated terminal extensor circuitry as defined in claim 10 and incorporating system status indicating circuitry adapted for location at a card-operated terminal having an input circuit connected between the corresponding connection of one of said multiple of output terminals and said point of reference potential and having a dual optical display indicating component in the output circuits thereof.

16. Remote card-operated terminal extensor circuitry as defined in claim 15 and incorporating an actuated terminal identification signal output terminal, identification signal generating circuitry having an output circuit connected to said identification signal terminal, having input terminals connected to said erect output terminals of said flip-flop circuits, and having selector circuitry for generating an identification signal of different tone corresponding to the signal input terminal activated at said given time.

17. Remote card-operated terminal extensor circuitry as defined in claim 12 and incorporating modem circuitry interposed between said central processing station and said transmission line at said one end thereof and between said transmission line at said other end thereof and said extensor circuitry, said modem circuitry at each end of said transmission line including a hybrid transformer having a line winding connected to said transmission line, a transmitting winding and a receiving winding, said transmitting winding being connected to said point of reference potential and to the output circuitry of a dual frequency tone generating circuit having an input circuit, the input circuit of one being coupled to said central processing station and the input circuit of the other being coupled to the common output circuits of said NAND gating circuits for generating a binary tone signal corresponding to the binary digital signal from a card-operated terminal, said receiving winding being connected to said point of reference potential and through a band-pair filter to a tone detector circuit having an output circuit, the output circuit of one being coupled to said central processing station and the output circuit of the other being coupled to said other optocoupler component.

18. Remote card-operated terminal extensor circuitry as defined in claim 17 and incorporating said tone detector circuit comprises a phase locked oscillator.

* * * * *